United States Patent
Ayuzawa et al.

(10) Patent No.: US 9,845,873 B2
(45) Date of Patent: Dec. 19, 2017

(54) COMBINATION OIL RING

(71) Applicant: TPR CO., LTD., Chiyoda-ku, Tokyo (JP)

(72) Inventors: Noriaki Ayuzawa, Tokyo (JP); Atsushi Nakazawa, Tokyo (JP); Masahide Hama, Tokyo (JP); Toshiyuki Shibuya, Tokyo (JP)

(73) Assignee: TPR CO., LTD., Tokyo (JP)

( * ) Notice: Subject to any disclaimer, the term of this patent is extended or adjusted under 35 U.S.C. 154(b) by 0 days.

(21) Appl. No.: 15/266,232

(22) Filed: Sep. 15, 2016

(65) Prior Publication Data

US 2017/0002925 A1    Jan. 5, 2017

Related U.S. Application Data

(63) Continuation of application No. 14/349,821, filed as application No. PCT/JP2012/070074 on Aug. 7, 2012.

(30) Foreign Application Priority Data

Nov. 11, 2011  (JP) .................................. 2011-247286
Dec. 21, 2011  (JP) .................................. 2011-279642
Feb. 14, 2012  (JP) .................................. 2012-029097

(51) Int. Cl.
*F16J 9/06*  (2006.01)
*F16J 9/12*  (2006.01)

(52) U.S. Cl.
CPC ............... *F16J 9/06* (2013.01); *F16J 9/068* (2013.01); *F16J 9/12* (2013.01)

(58) Field of Classification Search
CPC ........ F16J 9/06; F16J 9/068; F16J 9/12; F16J 9/066; F16J 9/067; F16J 9/145; F16J 9/203
See application file for complete search history.

(56) References Cited

U.S. PATENT DOCUMENTS 2,854,301 A    9/1958  Lutz
2,904,377 A *  9/1959  Endres .................... F16J 9/068
                                                      267/1.5
(Continued)

FOREIGN PATENT DOCUMENTS

EP    0543515 A1    5/1993
EP    0939254 A2    9/1999
(Continued)

OTHER PUBLICATIONS

Extended European Search Report corresponding to Application No. 12848605.7-1751/2778481 PCT/JP2012/070074; dated Jul. 10, 2015.

(Continued)

*Primary Examiner* — Eugene G Byrd
(74) *Attorney, Agent, or Firm* — Cantor Colburn LLP

(57) ABSTRACT

A combination oil ring includes a pair of upper and lower side rails and a spacer expander arranged there between, the spacer expander including a plurality of upper pieces and lower pieces alternately arranged in a circumferential direction with the pieces axially and circumferentially apart from each other, a coupling piece coupling pieces adjacent to each other, and flange portions formed standing at inner circumferential-side end portions of the upper pieces and the lower pieces so as to press the side rails, and a through hole being formed in the flange portions, wherein side rail support portions that project axially are formed at portions in the circumferential direction of outer circumferential-side end portions of the upper pieces and the lower pieces.

4 Claims, 12 Drawing Sheets

(56) References Cited

U.S. PATENT DOCUMENTS

| | | |
|---|---|---|
| 3,759,148 A | 9/1973 | Geffroy |
| 4,111,437 A | 9/1978 | Saylor |
| 4,115,959 A | 9/1978 | McCormick |
| 4,194,747 A | 3/1980 | Nisper |
| 4,429,885 A | 2/1984 | Chiba et al. |
| 4,542,907 A | 9/1985 | Chiba et al. |
| 4,548,416 A | 10/1985 | Maeda |
| 4,759,266 A | 7/1988 | Murray |
| 4,762,329 A | 8/1988 | Kooroki |
| 5,129,661 A | 7/1992 | Ono et al. |
| 5,195,758 A * | 3/1993 | Erway ............ F16J 9/066 267/1.5 |
| 5,794,941 A | 8/1998 | Lahrman |
| 6,267,384 B1 | 7/2001 | Watari |
| 7,036,823 B2 | 5/2006 | Takiguchi et al. |
| 7,044,472 B2 | 5/2006 | Takahashi et al. |
| 7,243,596 B2 | 7/2007 | Usui et al. |
| 7,854,191 B2 | 12/2010 | Kariya |
| 2002/0070507 A1 | 6/2002 | Heraud et al. |
| 2004/0262847 A1 | 12/2004 | Inoue |
| 2006/0027976 A1 | 2/2006 | Usui |
| 2006/0061043 A1 | 3/2006 | Takahashi et al. |
| 2006/0113730 A1 | 6/2006 | Suzuki et al. |
| 2006/0169135 A1 | 8/2006 | Usui et al. |
| 2008/0122185 A1 | 5/2008 | Katou |

FOREIGN PATENT DOCUMENTS

| | | |
|---|---|---|
| EP | 2365233 A1 | 9/2011 |
| JP | S4815801 A | 7/1971 |
| JP | S58206854 A | 12/1983 |
| JP | S60194151 U | 12/1985 |
| JP | 02031559 U | 2/1990 |
| JP | 02091263 U | 7/1990 |
| JP | 043163 U | 1/1992 |
| JP | H0517267 U | 3/1993 |
| JP | 08247289 A | 9/1996 |
| JP | H11315924 A | 11/1999 |
| JP | 2001132840 | 5/2001 |
| JP | 2001295926 A | 10/2001 |
| JP | 2005069289 A | 3/2005 |
| JP | 2011185383 | 9/2011 |
| WO | 0177548 A1 | 10/2001 |

OTHER PUBLICATIONS

International Search Report for Application PCT/JP2012/070074, dated Oct. 2, 2012 with English Translation.

Japanese Notice of Reasons for Rejection corresponding to Application No. JP2012-029097; dated Dec. 15, 2015, with English translation.

Japanese Office Action—Notice of Reasons for Rejection for Application JP2011-279642 dated Feb. 25, 2014 with English Translation.

Japanese Office Action—Notice of Reasons for Rejection for Application No. JP2011-247286, dated Mar. 4, 2014 with English Translation.

U.S. Final Office Action corresponding to U.S. Appl. No. 14/349,821; dated Jun. 17, 2016.

U.S. Final Office Action corresponding to U.S. Appl. No. 14/349,821; dated Sep. 25, 2015.

U.S. Non-Final Office Action corresponding to U.S. Appl. No. 14/349,821; dated Mar. 16, 2015.

U.S. Non-Final Office Action corresponding to U.S. Appl. No. 14/349,821; dated Sep. 2, 2014.

* cited by examiner

COMBINATION OIL RING

CROSS REFERENCE TO RELATED APPLICATIONS

The present application is a continuation application of U.S. patent application Ser. No. 14/349,821, filed on Apr. 4, 2014, the entire contents of which are incorporated herein by reference and priority to which is hereby claimed. Application Ser. No. 14/349,821 is the U.S. National stage of application No. PCT/JP2012/070074, filed on Aug. 7, 2012. Priority under 35 U.S.C. § 119(a) and 35 U.S.C. §365(b) is claimed from Japanese Application No. 2011-247286, filed Nov. 11, 2011, and Japanese Application No. 2011-279642, filed Dec. 21, 2011, and Japanese Application No. 2012-029097, filed Feb. 14, 2012, the disclosures of which are also incorporated herein by reference.

TECHNICAL FIELD

The present invention relates to a three-piece combination oil ring.

BACKGROUND ART

When a three-piece combination oil ring including a pair of upper and lower side rails and a spacer expander arranged therebetween is used, sludge such as unburned carbon or carbon produced from a product of combustion of lubricant oil tends to be deposited between the spacer expander and the side rails. With a progression of deposition, the side rails and the spacer expander stick to each other due to deposits, and the side rails cannot follow the shape of a cylinder bore, so that the oil ring may not be able to exert predetermined performance as an oil ring.

Meanwhile, in Patent Literature 1, a hole large enough to cause sludge to pass therethrough is formed in a center portion between convex and concave portions of an expander each having a substantially flat surface.

Also, in Patent Literature 2, a groove is formed in a surface that is close to a side rail of an upper piece and a surface that is close to a side rail of a lower piece of a spacer expander, and the groove communicates with a through hole formed in a flange portion for pressing the side rails in a combination oil ring. Also, since the groove extends radially and is open on an outer circumferential side, oil flows in from the opening portion to form a flow of oil from the outer circumferential side to an inner circumferential side, so that the oil containing sludge is easily discharged from the through hole in the flange portion, thereby making it difficult for deposits to accumulate.

CITATION LIST

Patent Literature

Patent Literature 1: Japanese Utility Model Publication No. 2-31559
Patent Literature 2: Japanese Patent Laid-Open No. 2011-185383

SUMMARY OF INVENTION

Technical Problem

In Patent Literature 1, however, since the hole is formed in the center portion between the convex and concave portions each having a substantially flat surface of the expander, the expander may lack rigidity.

Also, although Patent Literature 2 further proposes the technique for preventing the side rails and the spacer expander of the combination oil ring from sticking to each other, there is a demand for a further improvement in the performance of discharging the oil containing sludge.

It is an object of the present invention to prevent side rails and a spacer expander of a combination oil ring from sticking to each other.

Solution to Problem

The present invention is a combination oil ring including a pair of upper and lower side rails and a spacer expander arranged therebetween, the spacer expander including a plurality of upper pieces and lower pieces alternately arranged in a circumferential direction with the pieces axially and circumferentially apart from each other, a coupling piece coupling an upper piece and a lower piece adjacent to each other, and a flange portion formed standing at an inner circumferential-side end portion of each of the upper pieces and the lower pieces so as to press the side rails, and a through hole being formed in the flange portion,
wherein a side rail support portion that projects axially is formed at a portion in the circumferential direction of an outer circumferential-side end portion of each of the upper pieces and the lower pieces of the spacer expander.

The side rail support portion of the spacer expander may preferably be formed at an end portion in the circumferential direction of the outer circumferential-side end portion of each of the upper pieces and the lower pieces, or at a portion including the end portion.

The side rail support portion of the spacer expander may preferably be formed at a position of an intermediate portion in the circumferential direction of the outer circumferential-side end portion of each of the upper pieces and the lower pieces.

A portion other than the side rail support portion in the circumferential direction of the outer circumferential-side end portion of each of the upper pieces and the lower pieces of the spacer expander may preferably have a flush surface continuous from an inner circumferential side.

A portion other than the side rail support portion in the circumferential direction of the outer circumferential-side end portion of each of the upper pieces and the lower pieces of the spacer expander may preferably project to an axially opposite side from the side rail support portion. In this case, the portion other than the side rail support portion in the circumferential direction of the outer circumferential-side end portion of each of the upper pieces and the lower pieces of the spacer expander may preferably have a radial through hole on an inner circumferential side.

Each of gaps between the upper and lower pieces of the spacer expander and the side rails may preferably be continuously or discontinuously widened radially inward from an inner circumferential side of the side rail support portion to a base portion of the flange portion.

Preferably, a groove may be formed in a surface that is close to the side rail of at least the upper piece out of the upper and lower pieces of the spacer expander, and the groove may communicate with the through hole in the flange portion. Preferably, in this case, the groove may extend radially, and may be open on an outer circumferential side.

The side rail support portion of the spacer expander is formed in a trapezoidal shape, a semi-elliptical shape, or a rectangular shape as viewed from the radial direction.

Although a side rail support surface of the side rail support portion of the spacer expander may be a flat surface, the present invention is not limited thereto, and, for example, the side rail support surface may preferably be radially formed as a tapered surface or an arc surface so as to support the side rails at the outer circumferential-side end portion.

The side rail support portion of the spacer expander may preferably be formed by plasticity processing.

Advantageous Effects of Invention

In accordance with the present invention, since the side rail support portion is formed at a portion in the circumferential direction of the outer circumferential-side end portion of the spacer expander, a space is formed between the spacer expander and the side rails at the portion other than the side rail support portion in the circumferential direction of the outer circumferential-side end portion of the spacer expander. As a result, oil flows in from the space to form a flow of oil from the outer circumferential side to the inner circumferential side, and the oil containing sludge is easily discharged from the through hole in the flange portion of the spacer expander, so that the side rails and the spacer expander can be prevented from sticking to each other due to deposits.

DESCRIPTION OF EMBODIMENTS

In the following, one embodiment of the present invention will be described based on FIGS. 1 and 2.

Figure 1:
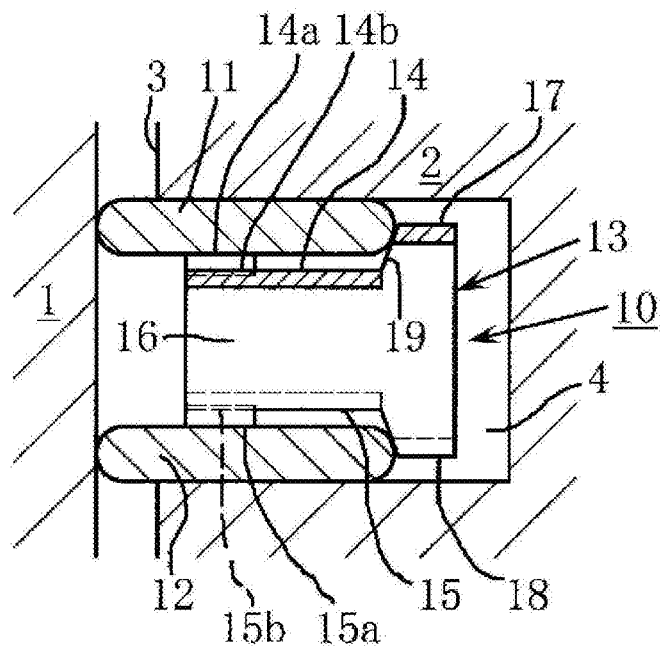
FIG. 1 is a vertical sectional view illustrating a state in which a piston to which a combination oil ring is mounted is inserted into a cylinder according to one embodiment of the present invention.

In FIG. 1, a combination oil ring 10 is mounted to an oil ring groove 4 formed in an outer circumferential surface 3 of a piston 2 within a cylinder 1. The combination oil ring 10 is a three-piece combination oil ring made of steel, and includes a pair of upper and lower side rails 11 and 12, and a spacer expander 13 arranged therebetween.

The side rails 11 and 12 are annular plate-like rails each provided with a gap.

The spacer expander 13 (see FIGS. 1 and 2) is composed of a plurality of axially-corrugated periodic elements lying in series in a circumferential direction. In the spacer expander 13, a plurality of horizontal upper and lower pieces 14 and 15 are alternately arranged in the circumferential direction with the pieces axially and circumferentially apart from each other, and an upper piece 14 and a lower piece 15 adjacent to each other are coupled together with a coupling piece 16. Flange portions 17 and 18 for pressing the side rails 11 and 12 are formed standing in an arched shape at inner circumferential-side end portions of each of the upper pieces 14 and each of the lower pieces 15, and a through hole 19 is formed in each of base portions of the flange portions 17 and 18.

In outer circumferential-side end portions of each of the upper pieces 14 and each of the lower pieces 15, end portions in the circumferential direction project axially outward to form support portions 14a and 15a for the side rails 11 and 12. That is, one end portion in the circumferential direction of the outer circumferential-side end portion of the upper piece 14 projects upward to form the support portion 14a for the side rail 11, and one end portion in the circumferential direction of the outer circumferential-side end portion of the lower piece 15 projects downward to form the support portion 15a for the side rail 12. Portions 14b and 15b other than the side rail support portions in the circumferential direction of the outer circumferential-side end portions of the upper piece 14 and the lower piece 15 have horizontal surfaces continuous from the inner circumferential side.

Accordingly, in the upper piece 14 and the lower piece 15, the end portions in the circumferential direction of the outer circumferential-side end portions project axially to constitute projecting surfaces that form the side rail support portions 14a and 15a, and the other portions (the portions other than the side rail support portions) 14b and 15b constitute the horizontal surfaces continuous from the inner circumferential side.

The spacer expander 13 is mounted in the oil ring groove 4 of the piston 2 in a compressed state with both gap end portions abutted against each other so as to generate a radially-outward expansion force, and brings an outer circumferential surface of each of the side rails 11 and 12 into close contact with an inner wall of the cylinder 1 by holding the upper and lower side rails 11 and 12 vertically (axially) apart from each other by the side rail support portions 14a and 15a of the upper and lower pieces 14 and 15, and pressing inner circumferential surfaces of the upper and lower side rails 11 and 12 by the upper and lower flange portions 17 and 18, respectively. Accordingly, the outer circumferential surfaces of the upper and lower side rails 11 and 12 come into press contact with the inner wall of the cylinder 1, and thereby scrape oil off the inner wall of the cylinder 1.

As described above, in the combination oil ring 10 according to the present embodiment, the side rail support portions 14a and 15a of the spacer expander 13 are formed at the end portions in the circumferential direction of the outer circumferential-side end portions of the upper piece 14 and the lower piece 15, so that spaces are formed between the upper piece 14 of the spacer expander 13 and the upper side rail 11, and between the lower piece 15 of the spacer expander 13 and the lower side rail 12, at the portions 14b and 15b other than the side rail support portions in the circumferential direction of the outer circumferential-side end portions. As a result, oil flows in from the spaces to form a flow of oil from the outer circumferential side to the inner circumferential side, and the oil containing sludge is easily discharged from the respective through holes 19 in the flange portions 17 and 18 of the spacer expander 13, so that the side rails 11 and 12 and the spacer expander 13 can be prevented from sticking to each other due to deposits.

Figure 3:
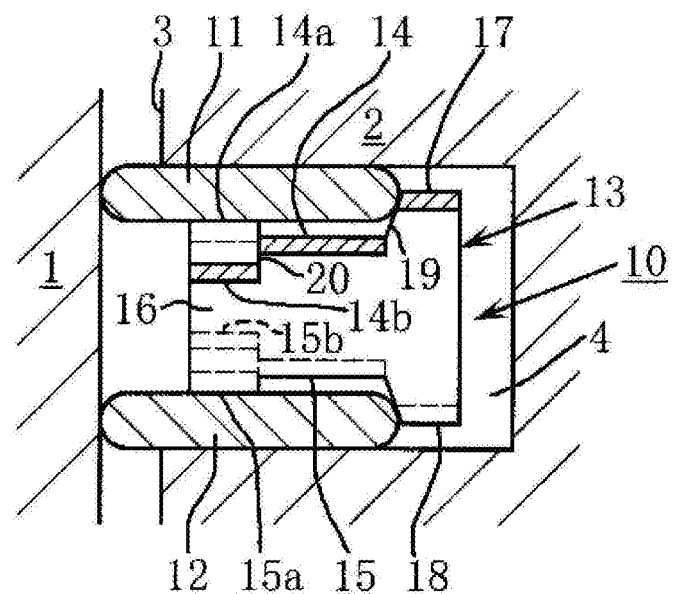
FIG. 3 is a vertical sectional view illustrating a state in which a piston to which a combination oil ring is mounted is inserted into a cylinder according to another embodiment of the present invention.
Figure 4:
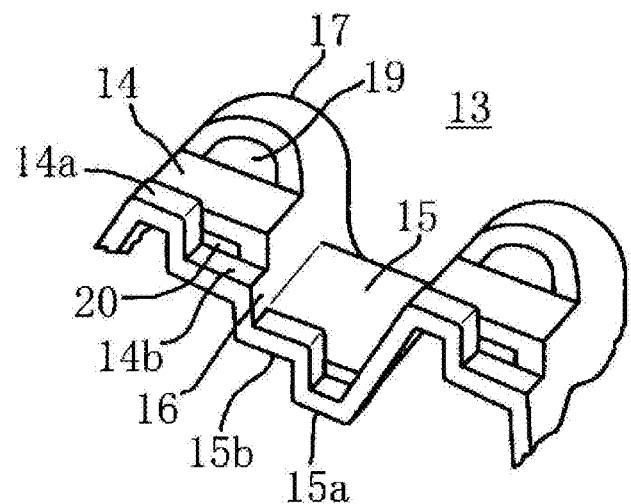
FIG. 4 is a perspective view illustrating a portion of a spacer expander.

FIGS. 3 and 4 show another embodiment of the present invention. The combination oil ring 10 according to the present embodiment differs from the combination oil ring according to the aforementioned embodiment in the configuration of the portions 14b and 15b other than the side rail support portions in the circumferential direction of the outer circumferential-side end portions of the upper piece 14 and the lower piece 15 of the spacer expander 13 as described below, and the other configurations are the same as those in the aforementioned embodiment.

In the present embodiment, in the outer circumferential-side end portions of the upper piece 14 and the lower piece 15 of the spacer expander 13, the end portions in the circumferential direction also project axially outward to form the support portions 14a and 15a for the side rails 11 and 12. That is, the end portion in the circumferential direction of the outer circumferential-side end portion of the upper piece 14 of the spacer expander 13 projects upward to form the support portion 14a for the side rail 11, and the end portion in the circumferential direction of the outer circumferential-side end portion of the lower piece 15 projects downward to form the support portion 15a for the side rail 12.

However, in the present embodiment, the portions 14b and 15b other than the side rail support portions in the circumferential direction of the outer circumferential-side end portions of the upper piece 14 and the lower piece 15 of the spacer expander 13 are configured as follows. That is, the portions 14b and 15b other than the side rail support portions in the circumferential direction of the outer circumferential-side end portions of the upper piece 14 and the lower piece 15 project to axially opposite sides from the side rail support portions 14a and 15a, and a radial through hole 20 is formed in each of the inner circumferential sides. That is, the portion 14b other than the side rail support portion in the circumferential direction of the outer circumferential-side end portion of the upper piece 14 of the spacer expander 13 projects downward to be formed one-step lower than the horizontal surface portion on the inner circumferential side, with the radial through hole 20 formed on the inner circumferential side, and the portion 15b other than the side rail support portion in the circumferential direction of the outer circumferential-side end portion of the lower piece 15 projects upward to be formed one-step higher than the horizontal surface portion on the inner circumferential side, with the radial through hole formed on the inner circumferential side.

As described above, in the combination oil ring 10 according to the present embodiment, the side rail support portions 14a and 15a of the spacer expander 13 are formed at the end portions in the circumferential direction of the outer circumferential-side end portions of the upper piece 14 and the lower piece 15, so that spaces are formed between the upper piece 14 of the spacer expander 13 and the upper side rail 11, and between the lower piece 15 of the spacer expander 13 and the lower side rail 12, at the portions 14b and 15b other than the side rail support portions in the circumferential direction of the outer circumferential-side end portions. As a result, oil flows in from the spaces to form a flow of oil from the outer circumferential side to the inner circumferential side, and the oil containing sludge is easily discharged from the respective through holes 19 in the flange portions 17 and 18 of the spacer expander 13, so that the side rails 11 and 12 and the spacer expander 13 can be prevented from sticking to each other due to deposits. Moreover, in the present embodiment, the portions 14b and 15b other than the side rail support portions project to the axially opposite sides from the side rail support portions 14a and 15a, and the radial through hole 20 is formed in each of the inner circumferential sides, so that the oil passes through the portions 14b and 15b other than the side rail support portions to be discharged to the inner circumferential side from the radial through holes 20, thereby making it difficult for the sludge to accumulate between the spacer expander 13 and the side rails 11 and 12.

Figure 5:
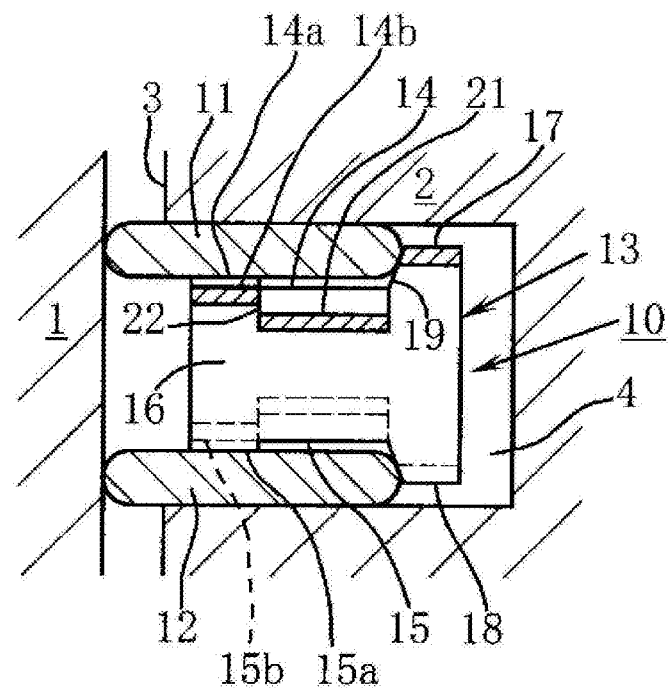
FIG. 5 is a vertical sectional view illustrating a state in which a piston to which a combination oil ring is mounted is inserted into a cylinder according to yet another embodiment of the present invention.
Figure 6:
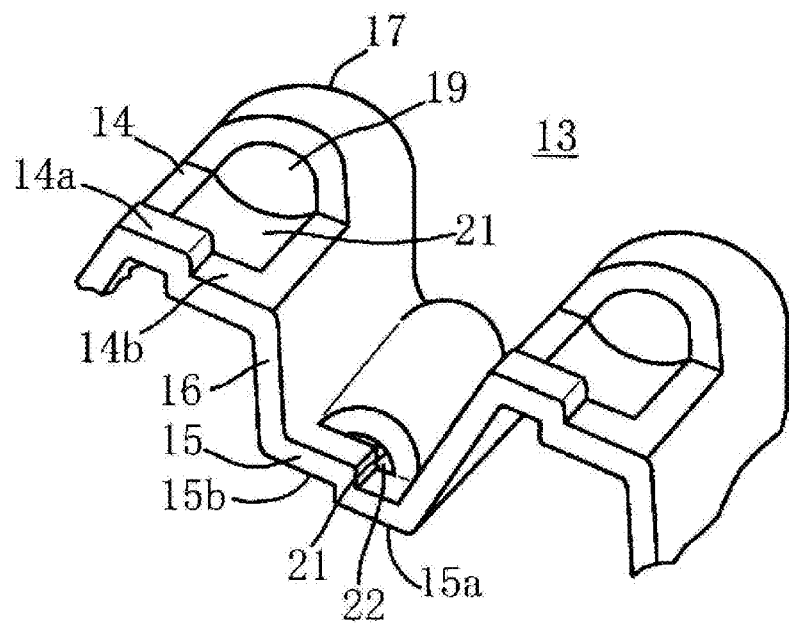
FIG. 6 is a perspective view illustrating a portion of a spacer expander.

FIGS. 5 and 6 show yet another embodiment of the present invention. The combination oil ring 10 according to the present embodiment differs from the combination oil ring according to the first embodiment described using FIGS. 1 and 2 in the configuration of portions on the inner circumferential side from the side rail support portions 14a and 15a of the upper piece 14 and the lower piece 15 of the spacer expander 13 as described below, and the other configurations are the same as those in the first embodiment.

In the present embodiment, in the outer circumferential-side end portions of the upper piece 14 and the lower piece 15 of the spacer expander 13, the end portions in the circumferential direction also project axially outward to form the support portions 14a and 15a for the side rails 11 and 12. That is, the end portion in the circumferential direction of the outer circumferential-side end portion of the upper piece 14 of the spacer expander 13 projects upward to form the support portion 14a for the side rail 11, and the end portion in the circumferential direction of the outer circumferential-side end portion of the lower piece 15 projects downward to form the support portion 15a for the side rail 12.

However, in the present embodiment, the portions on the inner circumferential side from the side rail support portions 14a and 15a of the upper piece 14 and the lower piece 15 of the spacer expander 13 are configured as follows. That is, a groove 21 that extends linearly in the radial direction is formed in the portion on the inner circumferential side from the side rail support portion in each of a surface that is close to the side rail 11 of the upper piece 14 and a surface that is close to the side rail 12 of the lower piece 15 of the spacer expander 13. The grooves 21 are formed by deforming predetermined portions of the upper piece 14 and the lower piece 15 into an arc shape in section by plasticity processing. Inner circumferential-side end portions of the grooves 21 in the upper piece 14 and the lower piece 15 communicate with the through holes 19 in the base portions of the flange portions 17 and 18, respectively, and outer circumferential-side end portions are open to an external space so as to communicate with the external space. Reference numeral 22 denotes the opening. Although the sectional shape of the groove 21 is shown as an arc shape, the present invention is not limited thereto, and, for example, an inverted trapezoidal shape or a V shape may be also used.

As described above, in the combination oil ring 10 according to the present embodiment, the side rail support portions 14a and 15a of the spacer expander 13 are formed at the end portions in the circumferential direction of the outer circumferential-side end portions of the upper piece 14 and the lower piece 15, so that spaces are formed between the upper piece 14 of the spacer expander 13 and the upper side rail 11, and between the lower piece 15 of the spacer expander 13 and the lower side rail 12, at the portions 14b and 15b other than the side rail support portions in the circumferential direction of the outer circumferential-side end portions. As a result, oil flows in from the spaces to form a flow of oil from the outer circumferential side to the inner circumferential side, and the oil containing sludge is easily discharged from the respective through holes 19 in the flange portions 17 and 18 of the spacer expander 13, so that the side rails 11 and 12 and the spacer expander 13 can be prevented from sticking to each other due to deposits. Moreover, in the present embodiment, the grooves 21 are formed in the upper piece 14 and the lower piece 15 of the spacer expander 13, so that the sizes of the through holes 19 provided at the base portions of the flange portions 17 and 18 and facing the space portions between the side rails 11 and 12 and the spacer expander 13 can be formed larger by sizes corresponding to the grooves 21 than those of the flat surfaces with no groove; therefore, the deposits between the upper and lower pieces 14 and 15 of the spacer expander 13 and the side rails 11 and 12 are easily discharged from the through holes 19 in the flange portions 17 and 18 of the spacer expander 13, and the side rails 11 and 12 and the spacer expander 13 can be prevented from sticking to each other due to the deposits. Also, since the grooves 21 extend in the radial direction and are open to the external space so as to communicate with the external space without being closed on the outer circumferential side, the oil flows in from the openings 22 to form a flow of oil from the outer circumferential side to the inner circumferential side; therefore, the deposits become difficult to accumulate and easily discharged from the through holes 19 in the flange portions 17 and 18, so that the side rails 11 and 12 and the spacer expander 13 can be further prevented from sticking to each other due to the deposits.

The structure of the grooves 21 described in the aforementioned embodiment may be also applied to the combination oil ring according to the embodiment described using FIGS. 3 and 4.

Also, although the side rail support portions 14a and 15a formed at the end portions in the circumferential direction of the outer circumferential-side end portions of the upper piece 14 and the lower piece 15 of the spacer expander 13 are formed at the end portions circumferentially opposite to each other of the outer circumferential-side end portions in the aforementioned embodiments, the side rail support portions 14a and 15a may be, of course, formed on the same side. Accordingly, the rigidity of the spacer expander 13 is increased.

Figure 7:
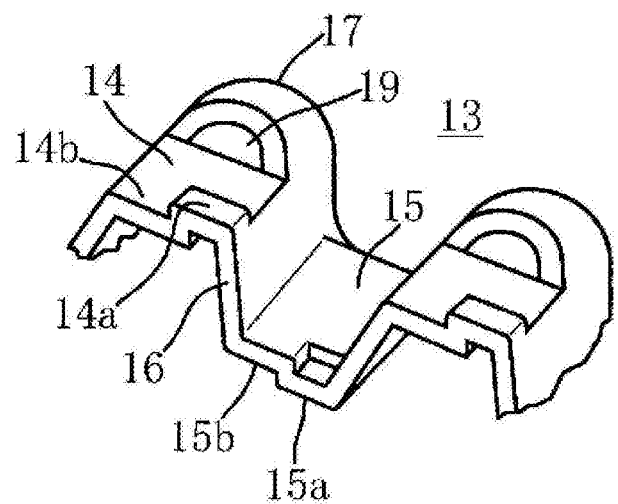
FIG. 7 is a perspective view illustrating a portion of yet another spacer expander of the present invention.
Figure 8:
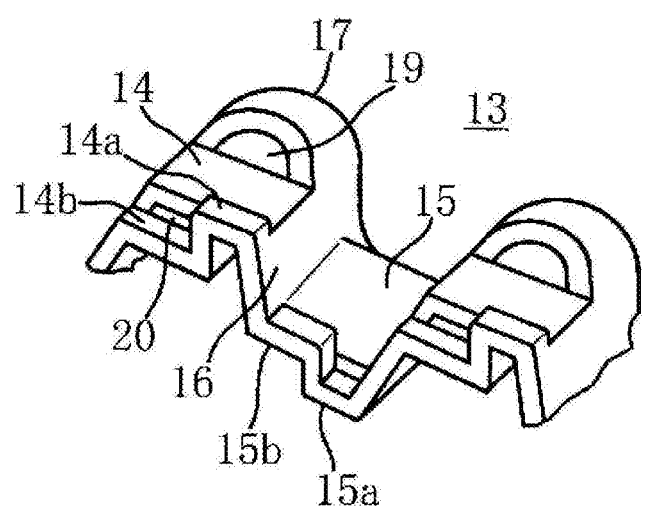
FIG. 8 is a perspective view illustrating a portion of yet another spacer expander of the present invention.
Figure 9:
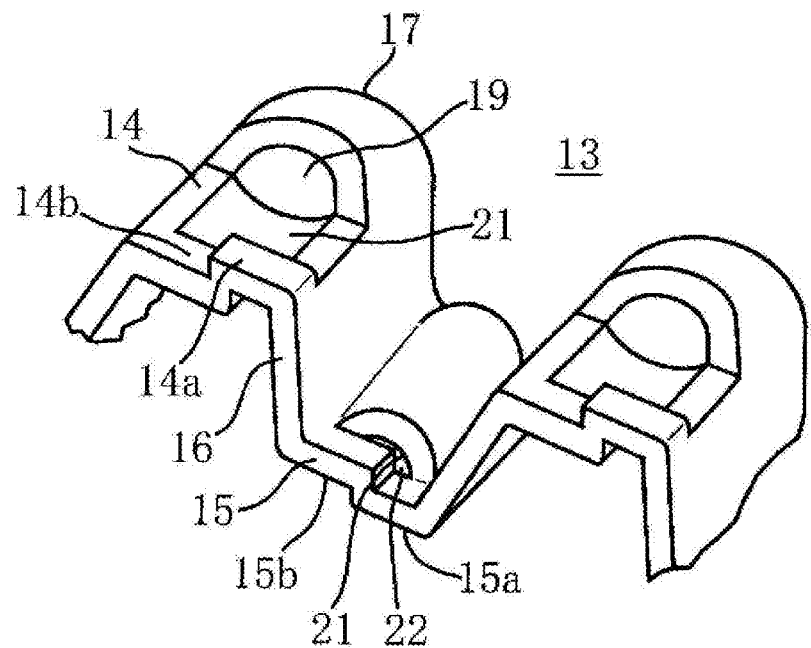
FIG. 9 is a perspective view illustrating a portion of yet another spacer expander of the present invention.

The above example is shown in FIGS. 7 to 9.

Figure 2:
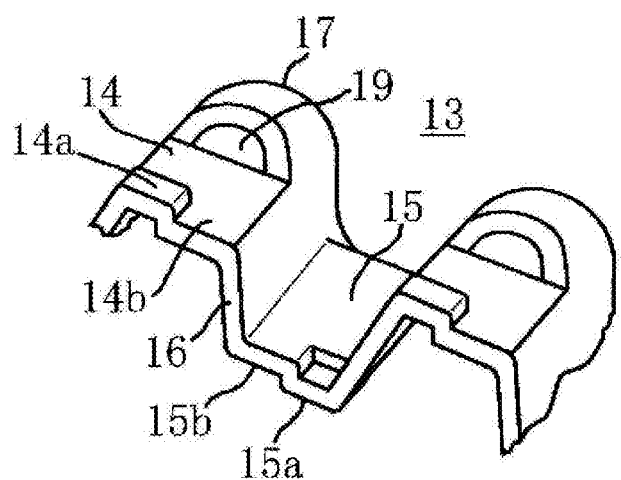
FIG. 2 is a perspective view illustrating a portion of a spacer expander.

FIG. 7 corresponds to the first embodiment shown in FIGS. 1 and 2, in which the side rail support portions 14a and 15a of the outer circumferential-side end portions of the upper piece 14 and the lower piece 15 of the spacer expander 13 are formed at the end portions on the same side in the circumferential direction. The other configurations are the same as those in the first embodiment shown in FIGS. 1 and 2. In the present embodiment, the same effects as those in the embodiment shown in FIGS. 1 and 2 are produced, and the rigidity of the spacer expander 13 can be also improved.

FIG. 8 corresponds to the embodiment shown in FIGS. 3 and 4, in which the side rail support portions 14a and 15a of the outer circumferential-side end portions of the upper piece 14 and the lower piece 15 of the spacer expander 13 are formed at the end portions on the same side in the circumferential direction. The other configurations are the same as those in the embodiment shown in FIGS. 3 and 4. In the present embodiment, the same effects as those in the embodiment shown in FIGS. 3 and 4 are produced, and the rigidity of the spacer expander 13 can be also improved.

FIG. 9 corresponds to the embodiment shown in FIGS. 5 and 6, in which the side rail support portions 14a and 15a of the outer circumferential-side end portions of the upper piece 14 and the lower piece 15 of the spacer expander 13 are formed at the end portions on the same side in the circumferential direction. The other configurations are the same as those in the embodiment shown in FIGS. 5 and 6. In the present embodiment, the same effects as those in the embodiment shown in FIGS. 5 and 6 are produced, and the rigidity of the spacer expander 13 can be also improved.

Figure 10:
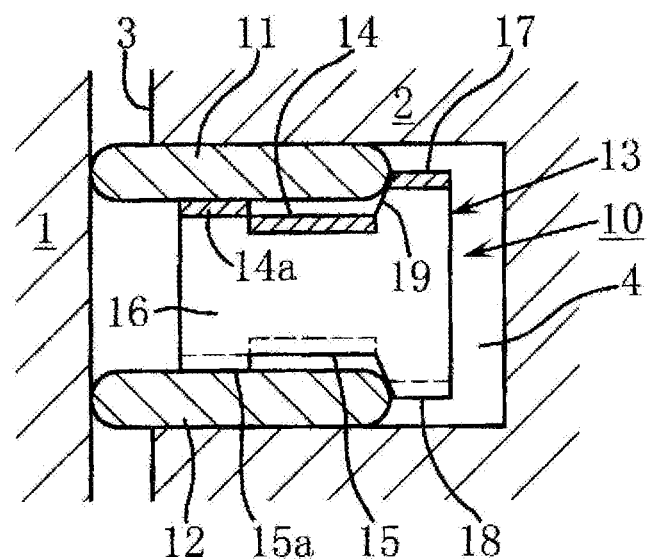
FIG. 10 is a vertical sectional view illustrating a state in which a piston to which a combination oil ring is mounted is inserted into a cylinder according to yet another embodiment of the present invention.
Figure 11:
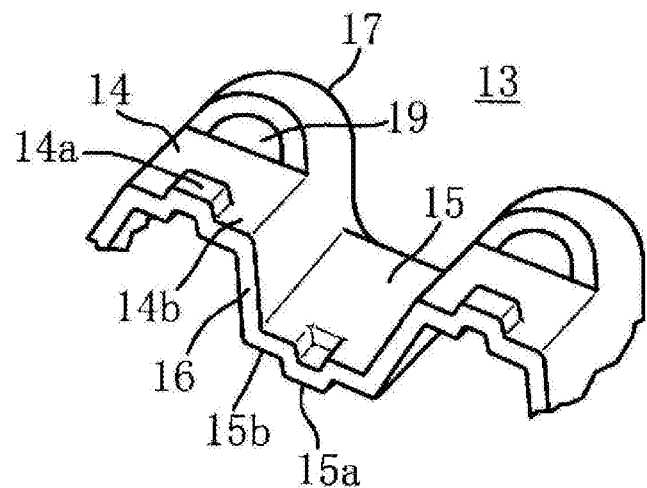
FIG. 11 is a perspective view illustrating a portion of a spacer expander.

FIGS. 10 and 11 show yet another embodiment of the present invention. The combination oil ring 10 according to the present embodiment differs from the combination oil ring according to the first embodiment described using FIGS. 1 and 2 in the configuration of the side rail support portions 14a and 15a of the outer circumferential-side end portions of the upper piece 14 and the lower piece 15 of the spacer expander 13 as described below, and the other configurations are the same as those in the first embodiment.

In the present embodiment, in the outer circumferential-side end portions of the upper piece 14 and the lower piece 15 of the spacer expander 13, center portions in the circumferential direction project axially outward to form support portions 14a and 15a for the side rails 11 and 12. That is, the center portion in the circumferential direction of the outer circumferential-side end portion of the upper piece 14 projects upward to form the support portion 14a for the side rail 11, and the center portion in the circumferential direction of the outer circumferential-side end portion of the lower piece 15 projects downward to form the support portion 15a for the side rail 12. Portions 14b and 15b other than the side rail support portions in the circumferential direction of the outer circumferential-side end portions of the upper piece 14 and the lower piece 15, that is, both side portions 14b and 15b of the side rail support portions 14a and 15a have horizontal surfaces continuous from the inner circumferential side.

Accordingly, in the upper piece 14 and the lower piece 15 of the spacer expander 13, the center portions in the circumferential direction of the outer circumferential-side end portions project axially to constitute projecting surfaces that form the side rail support portions 14a and 15a, and the other portions (the portions other than the side rail support portions) 14b and 15b constitute the horizontal surfaces continuous from the inner circumferential side.

As described above, in the combination oil ring 10 according to the present embodiment, the side rail support portions 14a and 15a of the spacer expander 13 are formed at the center portions in the circumferential direction of the outer circumferential-side end portions of the upper piece 14 and the lower piece 15, so that spaces are formed between the upper piece 14 of the spacer expander 13 and the upper side rail 11, and between the lower piece 15 of the spacer expander 13 and the lower side rail 12, at the both side portions 14b and 15b of the side rail support portions 14a and 15a in the circumferential direction of the outer circumferential-side end portions. As a result, oil flows in from the spaces to form a flow of oil from the outer circumferential side to the inner circumferential side, and the oil containing sludge is easily discharged from the respective through holes 19 in the flange portions 17 and 18 of the spacer expander 13, so that the side rails 11 and 12 and the spacer expander 13 can be prevented from sticking to each other due to deposits.

Figure 12:
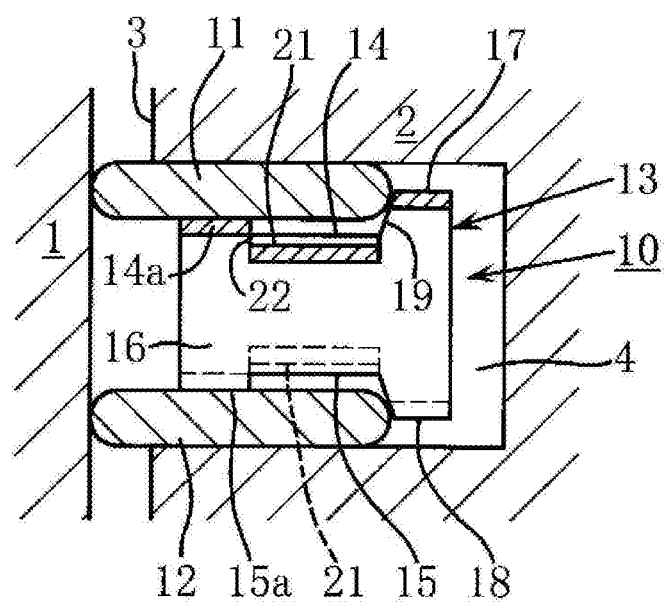
FIG. 12 is a vertical sectional view illustrating a state in which a piston to which a combination oil ring is mounted is inserted into a cylinder according to yet another embodiment of the present invention.
Figure 13:
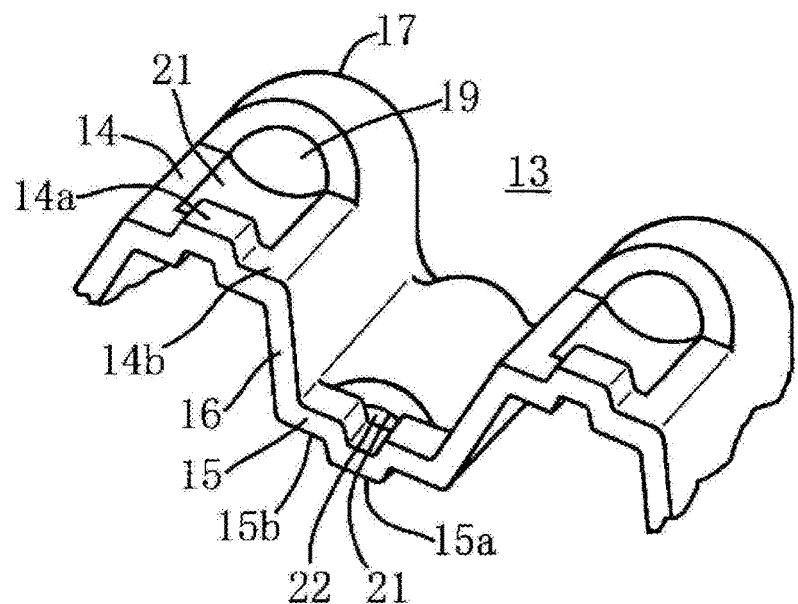
FIG. 13 is a perspective view illustrating a portion of a spacer expander.

FIGS. 12 and 13 show yet another embodiment of the present invention. The combination oil ring 10 according to the present embodiment differs from the combination oil ring according to the aforementioned embodiment described using FIGS. 10 and 11 in the configuration of portions on the inner circumferential side from the side rail support portions 14a and 15a of the upper piece 14 and the lower piece 15 of the spacer expander 13 as described below, and the other configurations are the same as those in the aforementioned embodiment.

In the present embodiment, in the outer circumferential-side end portions of the upper piece 14 and the lower piece 15 of the spacer expander 13, the center portions in the circumferential direction also project axially outward to form the support portions 14a and 15a for the side rails 11 and 12. That is, the center portion in the circumferential direction of the outer circumferential-side end portion of the upper piece 14 of the spacer expander 13 projects upward to form the support portion 14a for the side rail 11, and the center portion in the circumferential direction of the outer circumferential-side end portion of the lower piece 15 projects downward to form the support portion 15a for the side rail 12.

However, in the present embodiment, the portions on the inner circumferential side from the side rail support portions 14a and 15a of the upper piece 14 and the lower piece 15 of the spacer expander 13 are configured as follows. That is, a groove 21 that extends linearly in the radial direction is formed in the portion on the inner circumferential side from the side rail support portion in each of a surface that is close to the side rail 11 of the upper piece 14 and a surface that is close to the side rail 12 of the lower piece 15 of the spacer expander 13. The grooves 21 are formed by deforming predetermined portions of the upper piece 14 and the lower piece 15 into an arc shape in section by plasticity processing. Inner circumferential-side end portions of the grooves 21 in the upper piece 14 and the lower piece 15 communicate with the through holes 19 in the base portions of the flange portions 17 and 18, respectively, and outer circumferential-side end portions are open to an external space so as to communicate with the external space. Reference numeral 22 denotes the opening. Although the sectional shape of the groove 21 is shown as an arc shape, the present invention is not limited thereto, and, for example, an inverted trapezoidal shape or a V shape may be also used.

As described above, in the combination oil ring 10 according to the present embodiment, the side rail support portions 14a and 15a of the spacer expander 13 are formed at the center portions in the circumferential direction of the outer circumferential-side end portions of the upper piece 14 and the lower piece 15, so that spaces are formed between the upper piece 14 of the spacer expander 13 and the upper side rail 11, and between the lower piece 15 of the spacer expander 13 and the lower side rail 12, at the both side portions 14b and 15b of the side rail support portions 14a and 15a in the circumferential direction of the outer circumferential-side end portions. As a result, oil flows in from the spaces to form a flow of oil from the outer circumferential side to the inner circumferential side, and the oil containing sludge is easily discharged from the respective through holes 19 in the flange portions 17 and 18 of the spacer expander 13, so that the side rails 11 and 12 and the spacer expander 13 can be prevented from sticking to each other due to deposits. Moreover, in the present embodiment, the grooves 21 are formed in the upper piece 14 and the lower piece 15 of the spacer expander 13, so that the sizes of the through holes 19 provided at the base portions of the flange portions 17 and 18 and facing the space portions between the side rails 11 and 12 and the spacer expander 13 can be formed larger by sizes corresponding to the grooves 21 than those of the flat surfaces with no groove; therefore, the deposits between the upper and lower pieces 14 and 15 of the spacer expander 13 and the side rails 11 and 12 are easily discharged from the through holes 19 in the flange portions 17 and 18 of the spacer expander 13, and the side rails 11 and 12 and the spacer expander 13 can be prevented from sticking to each other due to the deposits. Also, since the grooves 21 extend in the radial direction and are open to the external space so as to communicate with the external space without being closed on the outer circumferential side, the oil flows in from the openings 22 to form a flow of oil from the outer circumferential side to the inner circumferential side; therefore, the deposits become difficult to accumulate and easily discharged from the through holes 19 in the flange portions 17 and 18, so that the side rails 11 and 12 and the spacer expander 13 can be further prevented from sticking to each other due to the deposits.

Figure 14:
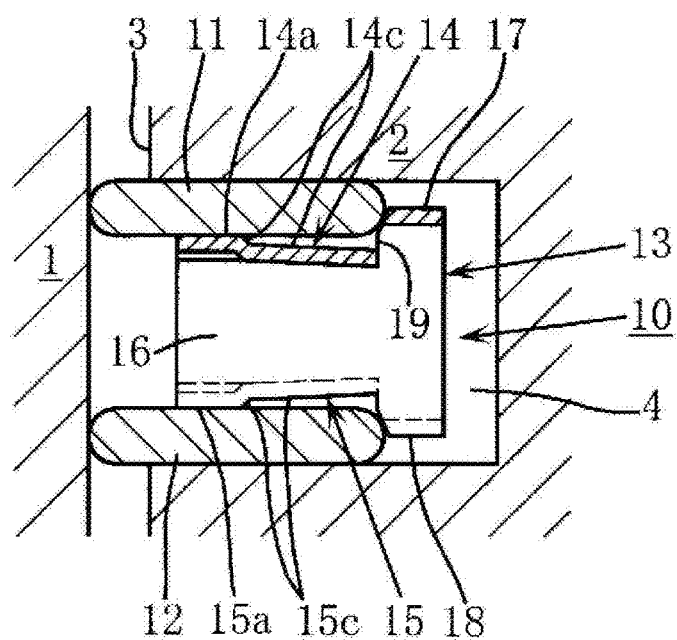
FIG. 14 is a vertical sectional view illustrating a state in which a piston to which a combination oil ring is mounted is inserted into a cylinder according to yet another embodiment of the present invention.
Figure 15:
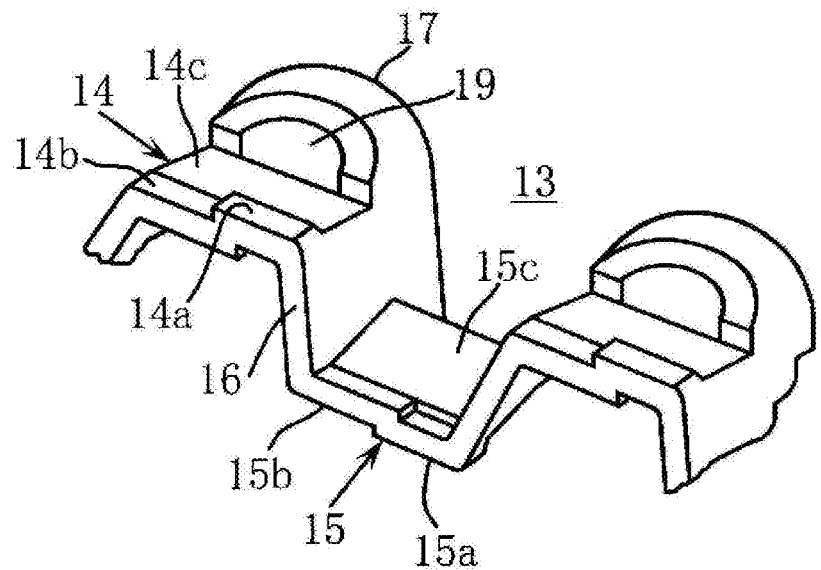
FIG. 15 is a perspective view illustrating a portion of a spacer expander.

FIGS. 14 and 15 show yet another embodiment of the present invention. The combination oil ring 10 according to the present embodiment differs from the combination oil ring according to the aforementioned embodiment shown in FIG. 7 in the configuration of portions on the inner circumferential side from the side rail support portions 14a and 15a of the upper piece 14 and the lower piece 15 of the spacer expander 13 as described below (also slightly differs in the configuration of the flange portions 17 and 18), and the other configurations are the same as those in the aforementioned embodiment.

In the present embodiment, a gap between the upper piece 14 of the spacer expander 13 and the side rail 11, and a gap between the lower piece 15 and the side rail 12 are continuously widened radially inward from the inner circumferential sides of the side rail support portions 14a and 15a to the base portions of the flange portions.

That is, in the present embodiment, the upper piece 14 of the spacer expander 13 has an inclined piece portion 14c that separates away from the side rail 11 radially inward from the inner circumferential side of the side rail support portion 14a to the base portion of the flange portion 17. Similarly, the lower piece 15 of the spacer expander 13 has an inclined piece portion 15c that separates away from the side rail 12 radially inward from the inner circumferential side of the side rail support portion 15a to the base portion of the flange portion 18.

Each of surfaces that are close to the side rails 11 and 12 of the flange portions 17 and 18 is composed of a lower end surface that stands vertically, and an inclined surface that extends upward therefrom so as to be inclined inward.

The combination oil ring 10 according to the present embodiment further provides following effects in addition to the effects produced by the embodiment shown in FIG. 7. That is, since the gap between the upper piece 14 and the side rail 11 and the gap between the lower piece 15 and the side rail 12 of the spacer expander 13, are continuously widened radially inward from the inner circumferential sides of the side rail support portions 14a and 15a to the base portions of the flange portions, sticking of the side rails 11 and 12 and the spacer expander 13 due to deposits can be suppressed. Also, since the upper piece 14 has the inclined piece portion 14c that separates away from the side rail 11 radially inward, oil containing sludge flows on the inclined surface of the upper piece 14 to be easily discharged from the through hole 19 in the flange portion 17, so that the sticking of the side rail 11 and the spacer expander 13 due to the deposits can be suppressed.

Figure 16:
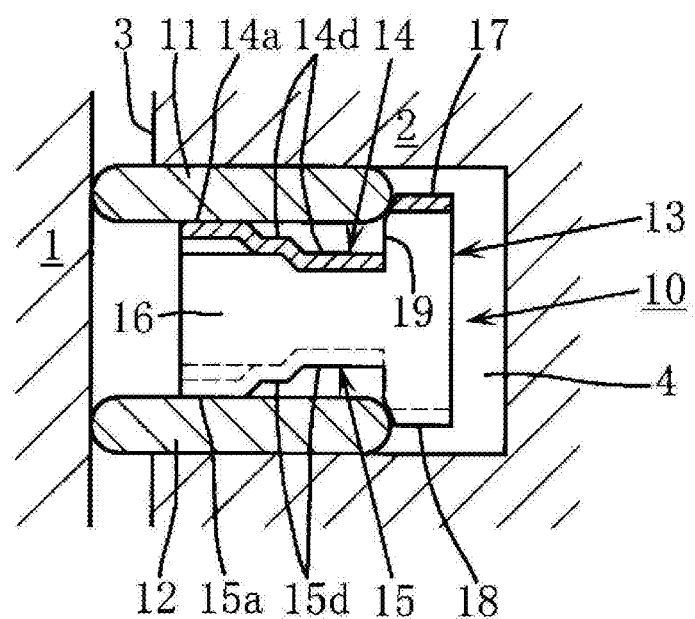
FIG. 16 is a vertical sectional view illustrating a state in which a piston to which a combination oil ring is mounted is inserted into a cylinder according to yet another embodiment of the present invention.
Figure 17:
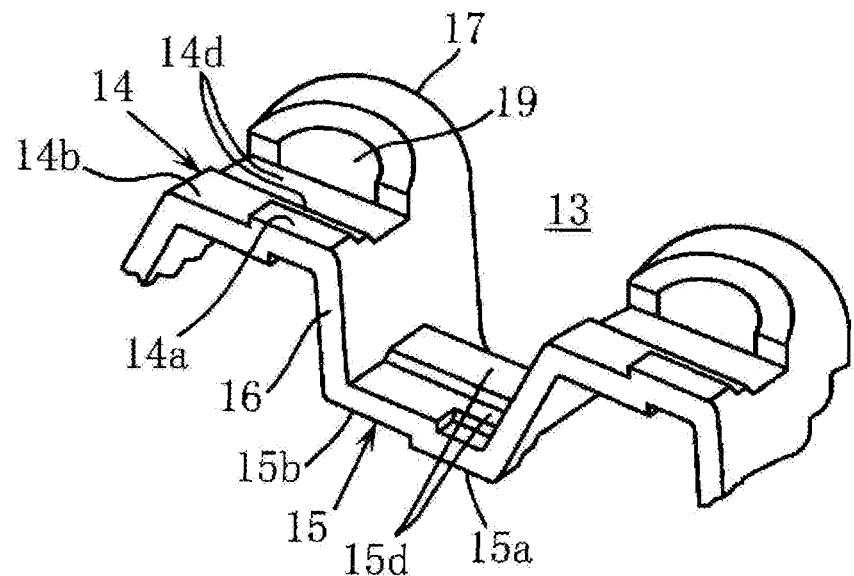
FIG. 17 is a perspective view illustrating a portion of a spacer expander.

FIGS. 16 and 17 show yet another embodiment of the present invention. The combination oil ring 10 according to the present embodiment differs from the combination oil ring according to the aforementioned embodiment shown in FIG. 7 in the configuration of portions on the inner circumferential side from the side rail support portions 14a and 15a of the upper piece 14 and the lower piece 15 of the spacer expander 13 as described below (also slightly differs in the configuration of the flange portions 17 and 18), and the other configurations are the same as those in the aforementioned embodiment.

In the present embodiment, a gap between the upper piece 14 and the side rail 11 and a gap between the lower piece 15 and the side rail 12 of the spacer expander 13, are discontinuously widened radially inward from the inner circumferential sides of the side rail support portions 14a and 15a to the base portions of the flange portions.

In the present embodiment, the upper piece 14 of the spacer expander 13 has a stepped piece portion 14d that separates away from the side rail 11 radially inward from the inner circumferential side of the side rail support portion 14a to the base portion of the flange portion 17. Similarly, the lower piece 15 of the spacer expander 13 has a stepped piece portion 15d that separates away from the side rail 12 radially inward from the inner circumferential side of the side rail support portion 15a to the base portion of the flange portion 18.

Each of surfaces that are close to the side rails 11 and 12 of the flange portions 17 and 18 is composed of a lower end surface that stands vertically, and an inclined surface that extends upward therefrom so as to be inclined inward.

The combination oil ring 10 according to the present embodiment further provides following effects in addition to the effects produced by the embodiment shown in FIG. 7. That is, since the gap between the upper piece 14 and the side rail 11, and the gap between the lower piece 15 and the side rail 12 of the spacer expander 13, are discontinuously widened radially inward from the inner circumferential sides of the side rail support portions 14a and 15a to the base portions of the flange portions, sticking of the side rails 11 and 12 and the spacer expander 13 due to deposits can be suppressed. Also, since the upper piece 14 has the stepped piece portion 14d that separates away from the side rail 11 radially inward, oil containing sludge flows on the stepped piece portion 14d of the upper piece 14 to be easily discharged from the through hole 19 in the flange portion 17, so that the sticking of the side rail 11 and the spacer expander 13 due to the deposits can be suppressed.

Figure 18:
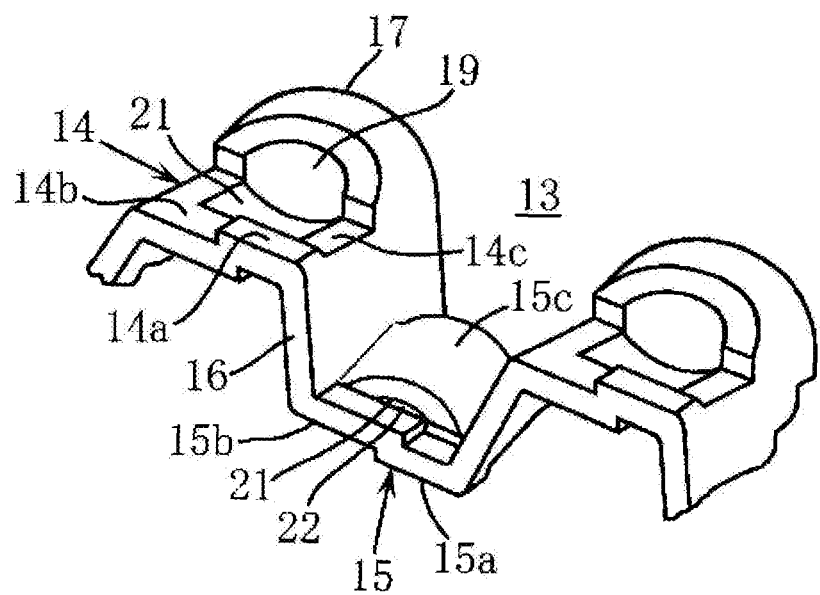
FIG. 18 is a perspective view illustrating a portion of yet another spacer expander of the present invention.

FIG. 18 shows yet another embodiment of the present invention. The combination oil ring 10 according to the present embodiment differs from the combination oil ring according to the aforementioned embodiment shown in FIGS. 14 and 15 in the configuration of portions on the inner circumferential side from the side rail support portions 14a and 15a of the upper piece 14 and the lower piece 15 of the spacer expander 13 as described below, and the other configurations are the same as those in the aforementioned embodiment.

In the present embodiment, a groove 21 that extends linearly in the radial direction is formed in each of the inclined piece portions 14c and 15c from the inner circumferential sides side rail support position 14a and 15a to the base portions of the flange portions in the surface that is close to the side rail 11 of the upper piece 14 and the surface that is close to the side rail 12 of the lower piece 15 of the spacer expander 13. The grooves 21 are formed by deforming predetermined portions of the inclined piece portions 14c and 15c of the upper piece 14 and the lower piece 15 into an arc shape in section by plasticity processing. Inner circumferential-side end portions of the grooves 21 in the upper piece 14 and the lower piece 15 communicate with the through holes 19 in the base portions of the flange portions 17 and 18, respectively, and outer circumferential-side end portions are open to an external space so as to communicate with the external space. Reference numeral 22 denotes the opening. Although the sectional shape of the groove 21 is shown as an arc shape, the present invention is not limited thereto, and, for example, an inverted trapezoidal shape or a V shape may be also used.

The combination oil ring 10 according to the present embodiment further provides following effects in addition to the effects produced by the aforementioned embodiment shown in FIGS. 14 and 15. That is, the grooves 21 are formed in the upper piece 14 and the lower piece 15 of the spacer expander 13, so that the sizes of the through holes 19 provided at the base portions of the flange portions 17 and 18 and facing the space portions between the side rails 11 and 12 and the spacer expander 13 can be formed larger by sizes corresponding to the grooves 21 than those of the flat surfaces with no groove; therefore, the deposits between the upper and lower pieces 14 and 15 of the spacer expander 13 and the side rails 11 and 12 are easily discharged from the through holes 19 in the flange portions 17 and 18 of the spacer expander 13, and the sticking of the side rails 11 and 12 and the spacer expander 13 due to the deposits can be suppressed. Also, since the grooves 21 extend in the radial direction and are open to the external space so as to communicate with the external space without being closed on the outer circumferential side, the oil flows in from the openings 22 to form a flow of oil from the outer circumferential side to the inner circumferential side; therefore, the deposits become difficult to accumulate and easily discharged from the through holes 19 in the flange portions 17 and 18, so that the sticking of the side rails 11 and 12 and the spacer expander 13 due to the deposits can be further suppressed.

Figure 19:
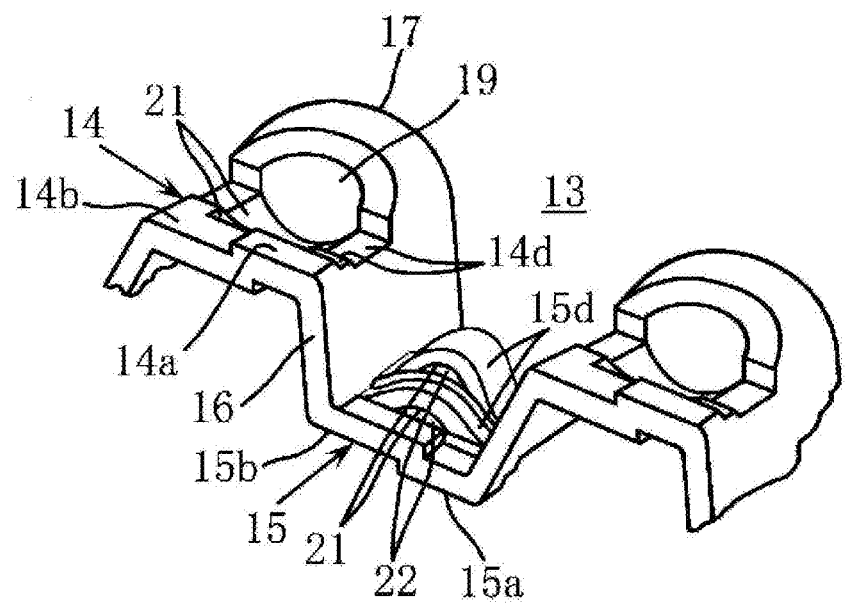
FIG. 19 is a perspective view illustrating a portion of yet another spacer expander of the present invention.

FIG. 19 shows yet another embodiment of the present invention. The combination oil ring 10 according to the present embodiment differs from the combination oil ring according to the aforementioned embodiment shown in FIGS. 16 and 17 in the configuration of portions on the inner circumferential side from the side rail support portions 14a and 15a of the upper piece 14 and the lower piece 15 of the spacer expander 13 as described below, and the other configurations are the same as those in the aforementioned embodiment.

In the present embodiment, a groove 21 that extends linearly in the radial direction is formed in each of the stepped piece portions 14d and 15d from the inner circumferential sides of the side rail support portions 14a and 15a to the base portions of the flange portions in the surface that is close to the side rail 11 of the upper piece 14 and the surface that is close to the side rail 12 of the lower piece 15 of the spacer expander 13. The grooves 21 are formed by deforming predetermined portions of the stepped piece portions 14d and 15d of the upper piece 14 and the lower piece 15 into an arc shape in section by plasticity processing. While inner circumferential-side end portions of the grooves 21 in the first stepped piece portions 14d and 15d of the upper piece 14 and the lower piece 15 are open, and outer circumferential-side end portions are open to an external space so as to communicate with the external space, inner circumferential-side end portions of the grooves 21 in the second stepped piece portions 14d and 15d communicate with the through holes 19 in the base portions of the flange portions 17 and 18, respectively, and outer circumferential-side end portions are open to the external space so as to communicate with the external space. Reference numeral 22 denotes the respective openings. Although the sectional shape of the groove 21 is shown as an arc shape, the present invention is not limited thereto, and, for example, an inverted trapezoidal shape or a V shape may be also used.

The combination oil ring 10 according to the present embodiment further provides following effects in addition to the effects produced by the embodiment shown in FIGS. 16 and 17. That is, the grooves 21 are formed in the upper piece 14 and the lower piece 15 of the spacer expander 13, so that the sizes of the through holes 19 provided at the base portions of the flange portions 17 and 18 and facing the space portions between the side rails 11 and 12 and the spacer expander 13 can be formed larger by sizes corresponding to the grooves 21 than those of the flat surfaces with no groove; therefore, the deposits between the upper and lower pieces 14 and 15 of the spacer expander 13 and the side rails 11 and 12 are easily discharged from the through holes 19 in the flange portions 17 and 18 of the spacer expander 13, and the sticking of the side rails 11 and 12 and the spacer expander 13 due to the deposits can be suppressed. Also, since the grooves 21 extend in the radial direction and are open to the external space so as to communicate with the external space without being closed on the outer circumferential side, the oil flows in from the openings 22 to form a flow of oil from the outer circumferential side to the inner circumferential side; therefore, the deposits become difficult to accumulate and easily discharged from the through holes 19 in the flange portions 17 and 18, so that the sticking of the side rails 11 and 12 and the spacer expander 13 due to the deposits can be further suppressed.

Figure 20:
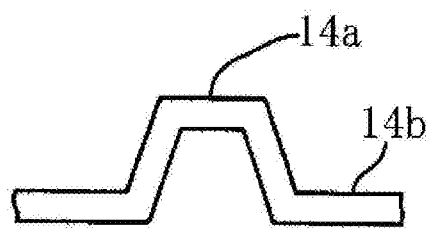
FIG. 20 is a view of a side rail support portion as viewed from a radial direction.
Figure 21:
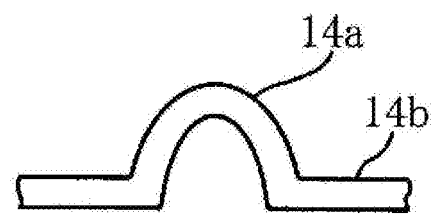
FIG. 21 is a view of a side rail support portion as viewed from a radial direction.

Although the shape of the side rail support portions 14a and 15a is shown as a trapezoidal shape (e.g., see FIG. 20) as viewed from the radial direction in the aforementioned embodiments, the present invention is not limited thereto, and the side rail support portions 14a and 15a may be also formed in, for example, a semi-elliptical shape (e.g., see FIG. 21) or a rectangular shape.

Figure 22:
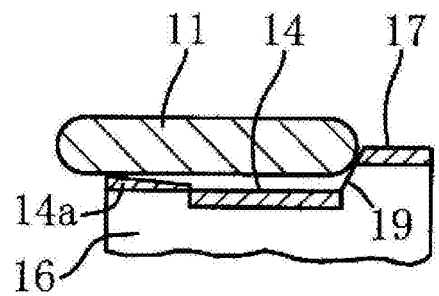
FIG. 22 is a vertical sectional view illustrating a portion of a combination oil ring.
Figure 23:
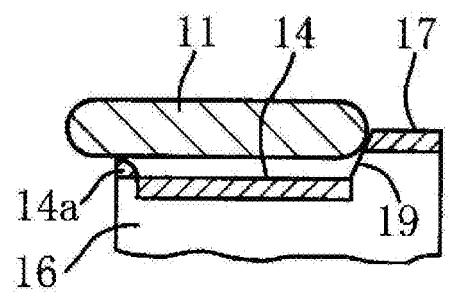
FIG. 23 is a vertical sectional view illustrating a portion of a combination oil ring.

Also, although the side rail support surfaces of the side rail support portions 14a and 15a are formed as flat surfaces in the aforementioned embodiments, the present invention is not limited thereto. A behavior during engine operation is stabilized by radially forming the side rail support surfaces as, for example, tapered surfaces (e.g., see FIG. 22) or arc surfaces (e.g., see FIG. 23), and supporting the side rails 11 and 12 at the outer circumferential-side end portions.

Figure 24:
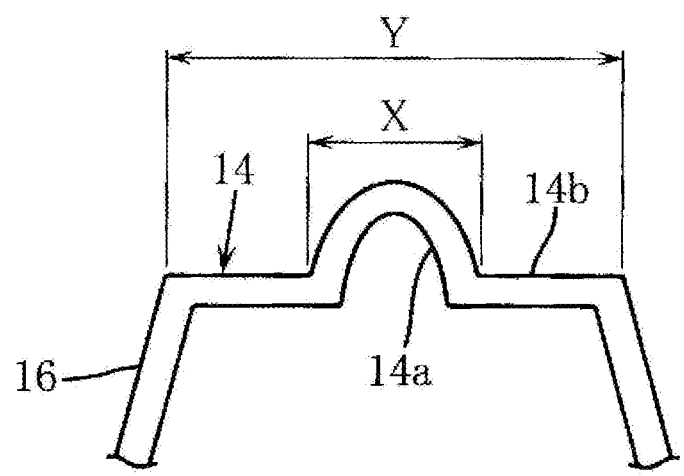
FIG. 24 is a view for explaining a dimensional relationship of a side rail support portion.

Also, as shown in FIG. 24, when a circumferential width of the side rail support portion 14a of the upper piece 14 is X and a circumferential width of the upper piece 14 is Y, it is preferable to satisfy the relationship of $0 < X/Y \leq 0.7$. The same applies to the lower piece 15.

Figure 25:
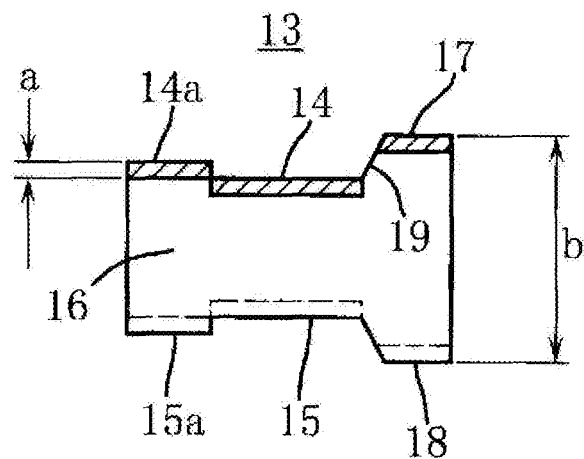
FIG. 25 is a view for explaining a dimensional relationship of a side rail support portion.

Also, as shown in FIG. 25, when an axial projecting height of the side rail support portion 14a of the upper piece 14 is "a" and an axial width on the side of the flange portions 17 and 18 of the spacer expander 13 is "b", it is preferable to satisfy the relationship of $0.02 < a/b \leq 0.2$. The same applies to the lower piece 15.

Figure 26:
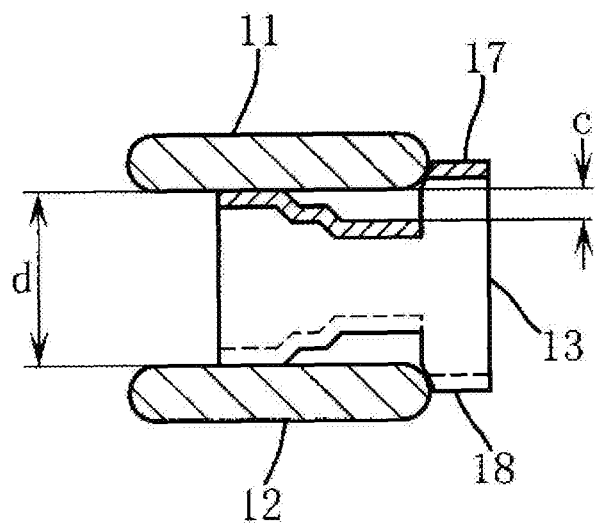
FIG. 26 is a view illustrating an axial distance c between a flange portion base position of a spacer expander and a side rail, and an axial width d of an outer circumferential-side end portion of the spacer expander.

Also, as shown in FIG. 26, when an axial distance from the base positions of the flange portions 17 and 18 of the spacer expander 13 to the side rails 11 and 12 is "c" and an axial width of the outer circumferential-side end portion of the spacer expander 13 is "d", it is preferable to satisfy the relationship of $c \geq 0.1$ mm and $c/d = 0.04$ to $0.3$.

If c/d is less than 0.04, the oil containing sludge becomes difficult to discharge from the through holes in the flange portions. If c/d is more than 0.3, the thickness of the spacer expander around the through holes in the flange portions becomes small.

The spacer expander 13 described above is formed by plasticity processing.

The invention claimed is:

1. A combination oil ring comprising a pair of upper and lower side rails and a spacer expander arranged therebetween, the spacer expander including a plurality of upper pieces and lower pieces alternately arranged in a circumferential direction with the pieces axially and circumferentially apart from each other, a coupling piece coupling an upper piece and a lower piece adjacent to each other, and a flange portion formed standing at an inner circumferential-side end portion of each of the upper pieces and the lower pieces so as to press the side rails, and a through hole being formed in the flange portion, wherein a side rail support portion of the spacer expander is formed at an end portion or an intermediate portion in the circumferential direction of an outer circumferential-side end portion of each of the upper pieces and the lower pieces:

wherein a length of the side rail support portion in the circumferential direction is shorter than a length of each of the upper pieces and the lower pieces in the circumferential direction so as to form spaces between each of the upper pieces of the spacer expander and the upper side rail, and between each of the lower pieces of the spacer expander and the lower side rail, at portions other than side rail support portions in the circumferential direction of the outer circumferential-side end portions;

wherein a length of the side rail support portion in the radial direction is less than half of that of upper and lower pieces except flange portions in the radial direction;

wherein a portion inward of each of the upper pieces and lower pieces from an inner circumferential side of the side rail support portion to a base portion of the flange portion radially is formed as an inclined or stepped surface such that a gap between the surface and an opposing side rail thereof is widened in a direction radially inward from the inner circumferential side of the side rail support portion to the base portion of the flange portion.

2. The combination oil ring according to claim 1, wherein the side rail support portion of the spacer expander is formed at an end portion in the circumferential direction of an outer circumferential-side end portion of each of the upper pieces and the lower pieces, and wherein a portion other than the side rail support portion in the circumferential direction of the outer circumferential-side end portion of each of the upper pieces and the lower pieces of the spacer expander projects to an axially opposite side from the side rail support portion.

3. The combination oil ring according to claim 2, wherein the portion other than the side rail support portion in the circumferential direction of the outer circumferential-side end portion of each of the upper pieces and the lower pieces of the spacer expander has a radial through hole on an inner circumferential side thereof.

4. The combination oil ring according to claim 1, wherein a groove is formed in the inclined or stepped surface extending in the radial direction from the inner circumferential side of the side rail support portion to the base portion of the flange portion such that an inner circumferential-side end portion of the groove is open to communicate with the through hole in the flange portion, and an outer circumferential-side end portion of the groove is open to communicate with an external space.

* * * * *